United States Patent
Gould et al.

(10) Patent No.: US 10,460,175 B1
(45) Date of Patent: Oct. 29, 2019

(54) DEEP LEARNING PROCESSING OF VIDEO

(71) Applicant: Amazon Technologies, Inc., Seattle, WA (US)

(72) Inventors: Stephen Gould, Seattle, WA (US); Andrea Olgiati, Gilroy, CA (US)

(73) Assignee: Amazon Technologies, Inc., Seattle, WA (US)

(*) Notice: Subject to any disclaimer, the term of this patent is extended or adjusted under 35 U.S.C. 154(b) by 184 days.

(21) Appl. No.: 15/624,258

(22) Filed: Jun. 15, 2017

(51) Int. Cl.
*G06K 9/00* (2006.01)
*G06N 3/00* (2006.01)
*G06N 3/08* (2006.01)
*G06N 3/04* (2006.01)
*G06K 9/46* (2006.01)
*G06K 9/62* (2006.01)

(52) U.S. Cl.
CPC ....... *G06K 9/00718* (2013.01); *G06K 9/4628* (2013.01); *G06K 9/6215* (2013.01); *G06N 3/04* (2013.01); *G06N 3/08* (2013.01)

(58) Field of Classification Search
CPC ............. G06K 9/00718; G06K 9/4628; G06K 9/6215; G06N 3/04; G06N 3/08
See application file for complete search history.

(56) References Cited

U.S. PATENT DOCUMENTS

2018/0121791 A1* 5/2018 O'Connor ............... G06N 3/049
2018/0165576 A1* 6/2018 Latapie .................... G06N 3/08

* cited by examiner

*Primary Examiner* — David F Dunphy
(74) *Attorney, Agent, or Firm* — Lowenstein Sandler LLP

(57) ABSTRACT

A method and system for processing multiple frames of a video by a neural network are provided. Two frames of a video may be analyzed to determine if at least a portion of the layer-by-layer processing by a neural network can be skipped or terminated. Processing of a first frame of the video is performed by the neural network. A next frame of the video is processed by the neural network, such that processing of fewer layers (or sets of operations) of the neural network is performed if the first frame and the second frame are substantially similar.

20 Claims, 8 Drawing Sheets

DEEP LEARNING PROCESSING OF VIDEO

BACKGROUND

Deep learning neural networks are employed to analyze an image to determine if an object is present in the image. To do so, an image is pushed through a neural network trained to detect one or more objects. The trained neural network is configured to perform operations (e.g., matrix multiplications) using a set of learned parameters (resulting from a training phase) to determine if an object is detected. To process an entire image, these operations are performed by the trained neural network on each of the pixels to generate the object classification label, resulting in a significant computational expense (e.g., ten billion floating point operations). In this regard, every pixel of the image is analyzed to identify patterns in the image (e.g., shapes, sizes, colors, etc.) for purposes of classifying and labeling objects in the image.

In certain video processing systems, each frame in the video is processed by the trained neural network independently. In this architecture, after fully processing each frame, an analysis of what is occurring across the multiple frames is performed. As such, there are instances when a large amount of processing is performed with regard to two or more contiguous frames of video (i.e., processing each frame through the entire neural network), even though only a small amount of the data has changed from one frame to the next. Accordingly, processing of the multiple frames of a video in this manner results in computational inefficiencies.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

Figure 1:
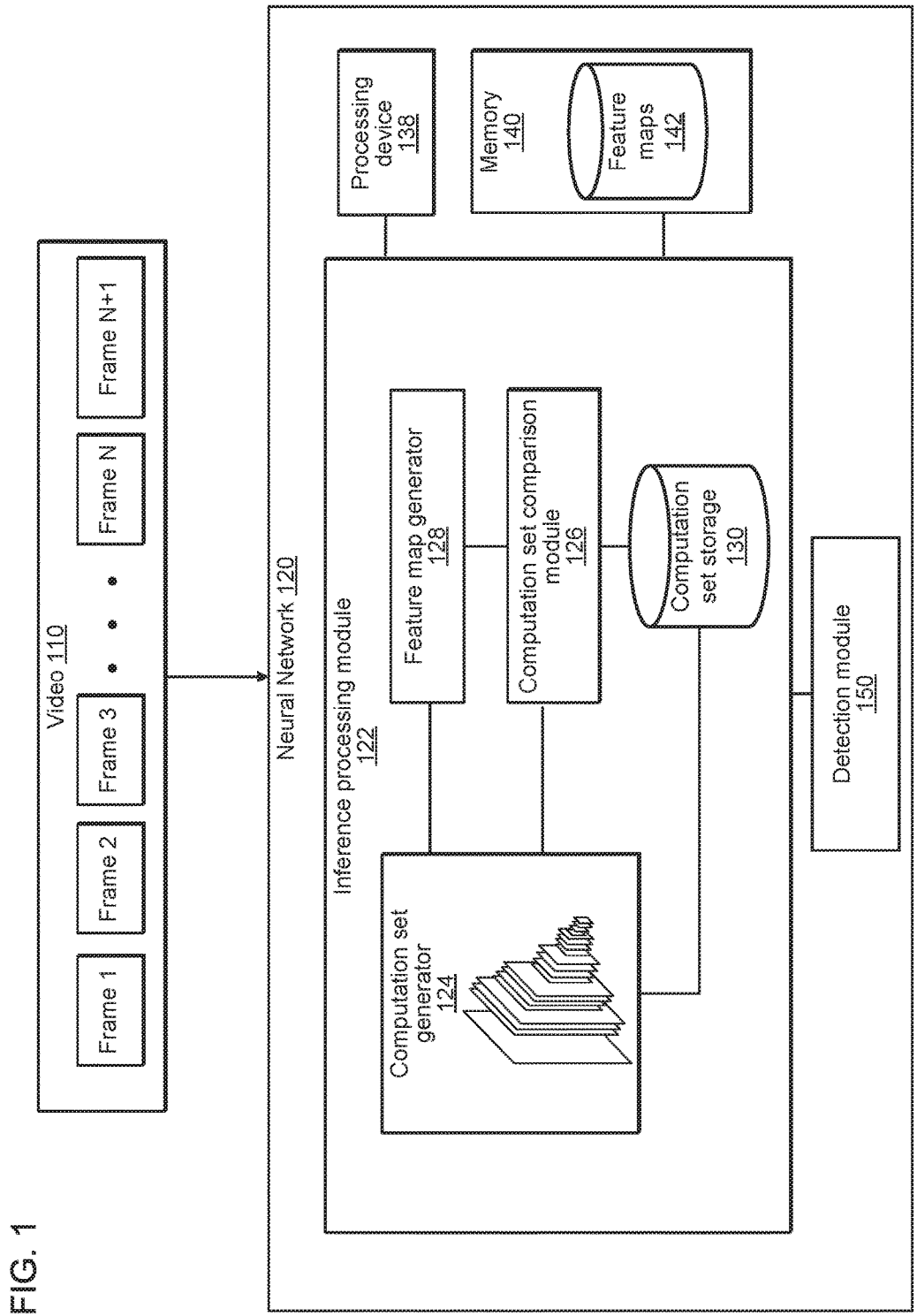
FIG. 1 illustrates an example neural network, according to one embodiment.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to processing video using a deep neural network having multiple processing layers (e.g., multiple sets of operations) configured to detect one or more objects or concepts in a video. A deep neural network is an artificial neural network with multiple hidden layers of units between an input layer and an output layer. In one embodiment, the deep neural network processes data on a layer-by-layer basis, wherein a set of operations (e.g., a layer) is applied to the pixel information of a frame of the video to identify one or more labels for the video frame. In one embodiment, as the layer-by-layer processing continues, information from each respective layer is aggregated. In one embodiment, an aggregated set of computation values is built for the frame as the layer-by-layer processing of the neural network proceeds. For example, the output or results of a first layer (e.g., a set of computations including one or more labels) may be used as an input for a subsequent layer, wherein an additional set of operations are performed on pixels of the video frame at the subsequent layer. In one embodiment, more and more specific data is being analyzed as the layers progress, such as shapes, edges, parts of objects, etc. In one embodiment, for example, at a last layer, full objects are analyzed to enable object classification.

In one embodiment, a neural network may be configured to identify a particular object. For example, a neural network may be configured to determine if an image includes or can be classified as a "dog" (i.e., determining if there is a "dog" in the image). In one embodiment, the processing is applied to one or more layers to determine if, based on the information analyzed in that layer, the image can be classified as a "dog". In one embodiment, the neural network is configured to take low level pixel information of an image and perform a high-level classification of the image as a concept (e.g., determine it is an image of a dog). In one embodiment, as multiple layers are analyzed, the additional information determined for the respective layers is aggregated by the neural network until a final classification is made.

In one embodiment, a neural network performs deep learning inference processing on multiple frames of a video. In one embodiment, inference processing is used to infer information about one frame of a video based on information learned about another frame of the video. In one embodiment, contiguous frames (e.g., Frame N and Frame N+1) of a video are analyzed by a neural network system. In one embodiment, inference processing is performed on a layer of a first frame (e.g., Layer 2 of Frame N) to produce a multi-dimensional matrix or tensor table. In one embodiment, the matrix includes a table of encoded values associated with the layer.

In one embodiment, inference processing is applied to a same layer of a subsequent frame (e.g., Layer 2 of Frame N+1) to generate a corresponding matrix. In one embodiment, the matrices for the layers of the two frames are compared. In one embodiment, it is determined that the matrices are at least substantially the same, as described in greater detail below. In one embodiment, identifying a match between corresponding layers of two frames indicates that there is little to no change in the frames, and inference processing of the subsequent frame (e.g., Frame 2) is terminated.

For example, if a matrix for Layer 2 (L2) of Frame N+1 is substantially similar to a matrix computed for the corresponding layer of a previous frame (e.g., L2 of Frame N), then it is determined that the results of an analysis of L2 of Frame N+1 are substantially similar to the results of the analysis of L2 of Frame N. In one embodiment, the results of the analysis of a layer may include a feature map. In one embodiment, the feature map may include one or more "labels" associated with the image. For example, a feature map associated with a layer may identify a number of legs of an object, a number of eyes of the object, a color of the object, and whether the object has fur.

In one embodiment, the entire matrices for corresponding layers (e.g., Layer 2) of multiple frames (e.g., Frames N and N+1) may match. In one embodiment, if the entire matrices match, then processing of the remaining layers of the neural network with respect to the subsequent frame (e.g., Frame N+1) may be terminated.

In one embodiment, a comparison of the tensor tables associated with two frames may result in a determination that the two frames include a matching portion and a non-matching portion. For example, there may be a change in a foreground of the first and second frames, while the background does not change. In one embodiment, one or more additional layers of the neural network may be applied to the non-matching portion of the later frame (e.g., Frame N+1), while inference processing with regard to the matching portion may be terminated.

In one embodiment, a comparison is made between the computations generated as a result of the application of a layer of the neural network (e.g., comparing the matrix or tensor table corresponding to the performing of a set of operations associated with a layer of the network applied to the two frames). In one embodiment, the comparison may include a statistical analysis of the computation sets (e.g., matrices or tensor tables) to determine a difference metric representing a level or amount of difference between the two matrices representing a layer of the two frames. In one embodiment, the difference metric may be compared to a threshold value to determine if, as a whole, the corresponding layers of the two frames are substantially similar to one another.

In one embodiment, a value of the difference metric may be mapped to a subsequent layer to which processing may be skipped. For example, the mapping may indicate that if the difference metric is in a first range, processing is skipped to the next layer (e.g., from layer 2 to layer 3). In one embodiment, the mapping may indicate that if the difference metric is in a second range, processing of the later frame may be skipped two layers ahead (e.g., from layer 2 to layer 4), or may be skipped entirely. In one embodiment, the mapping may provide an indication of the layer to skip to in view of ranges associated with the difference metric determined by the comparison of a matrix resulting from application of a given layer (e.g., layer 2) to two frames. In one embodiment, the set of operations associated with that later layer (i.e., the layer skipped to) may be applied to the later frame (e.g., Frame N+1), thereby skipping the processing associated with the intervening layers of the neural network.

In one embodiment, processing of a frame may include multiple computational paths through the neural network. In one embodiment, the processing associated with a portion of a first computational path may be skipped for the frame, while the processing associated with another of the multiple computational paths proceeds. In one embodiment, the computation sets may be stored in a cache and retrieved for merger with computation sets for the other path wherein one or more layers have been skipped. In one embodiment, the processing of a frame may be skipped to a point where multiple computational paths merge. In one embodiment, cached data for one computational path may be merged or combined with computational data resulting from the processing at a layer that was skipped to.

In one embodiment, the output or generated results for each layer is a feature map. In one embodiment, if it is determined that a given layer (e.g., layer 2) of two frames is the same (based on a comparison of the matrices associated with the respective layers), a feature map for that layer (e.g., layer 2) of frame N may be stored and persisted for frame N+1.

FIG. 1 is a block diagram illustrating various components of a neural network 120, according to one embodiment. In one embodiment, the neural network 120 may be trained to detect one or more objects in a video 110 including multiple frames (e.g., frame 1, frame 2, frame 3, . . . frame N, and frame N+1). In one embodiment, the neural network 120 may include an inference processing module 122 including a computation set generator 124, a computation set comparison module 126, a feature map generator 128, and computation set storage 130. In one embodiment, the neural network includes a detection module 150, a processing device 138 and a memory 136 configured to execute and store instructions associated with the functionality of the various components, services, and modules of the neural network 120, as described in greater detail below in connection with FIGS. 2-8.

In one embodiment, the neural network 120 receives the video 110. In one embodiment, the video 110 may be received by the neural network 120 via a suitable network (not shown), including, for example, the Internet, intranets, extranets, wide area networks (WANs), local area networks (LANs), wired networks, wireless networks, or other suitable networks, etc., or any combination of two or more such networks. In one embodiment, example neural networks may include, but are not limited to, convolutional neural networks, region-based convolutional neural networks, deep neural networks, etc.

In one embodiment, the computation set generator 124 includes a collection of layers of the neural network 120. In one embodiment, each layer may be a set of operations to be performed on one or more frames of the video 110 (or on the output of a set of operations performed at a previous layer for one or more frames). For example, the inference processing module 122 may be configured to perform inference processing on a frame-by-frame level for the received video 110.

In one embodiment, a layer of the neural network is applied to a frame of the video to generate a resulting computation set (e.g., a multi-dimensional matrix or tensor table). In one embodiment, the matrix is a tensor or three-dimensional table including data blocks that may be mapped to data blocks in another layer. In one embodiment, the computation set generator 124 processes a frame of the video 110 (e.g., Frame N) using the multiple layers of the neural network. In one embodiment, the output of each layer of processing of the frame is a matrix (or computation set)

that is stored in the computation set storage 130. For example, the layer-by-layer processing of Frame N may result in multiple matrices corresponding to that frame of the video 110 (e.g., matrix 1 (M1), layer 1 (L1), frame N (FN); M2, L2, FN; M3, L3, FN; etc.). In one embodiment, a matrix generated by the computation set generator 124 includes a table of encoded values associated with the layer. A later layer may process the output of one or more previous layers to generate a new matrix associated with that later layer.

Figure 2:
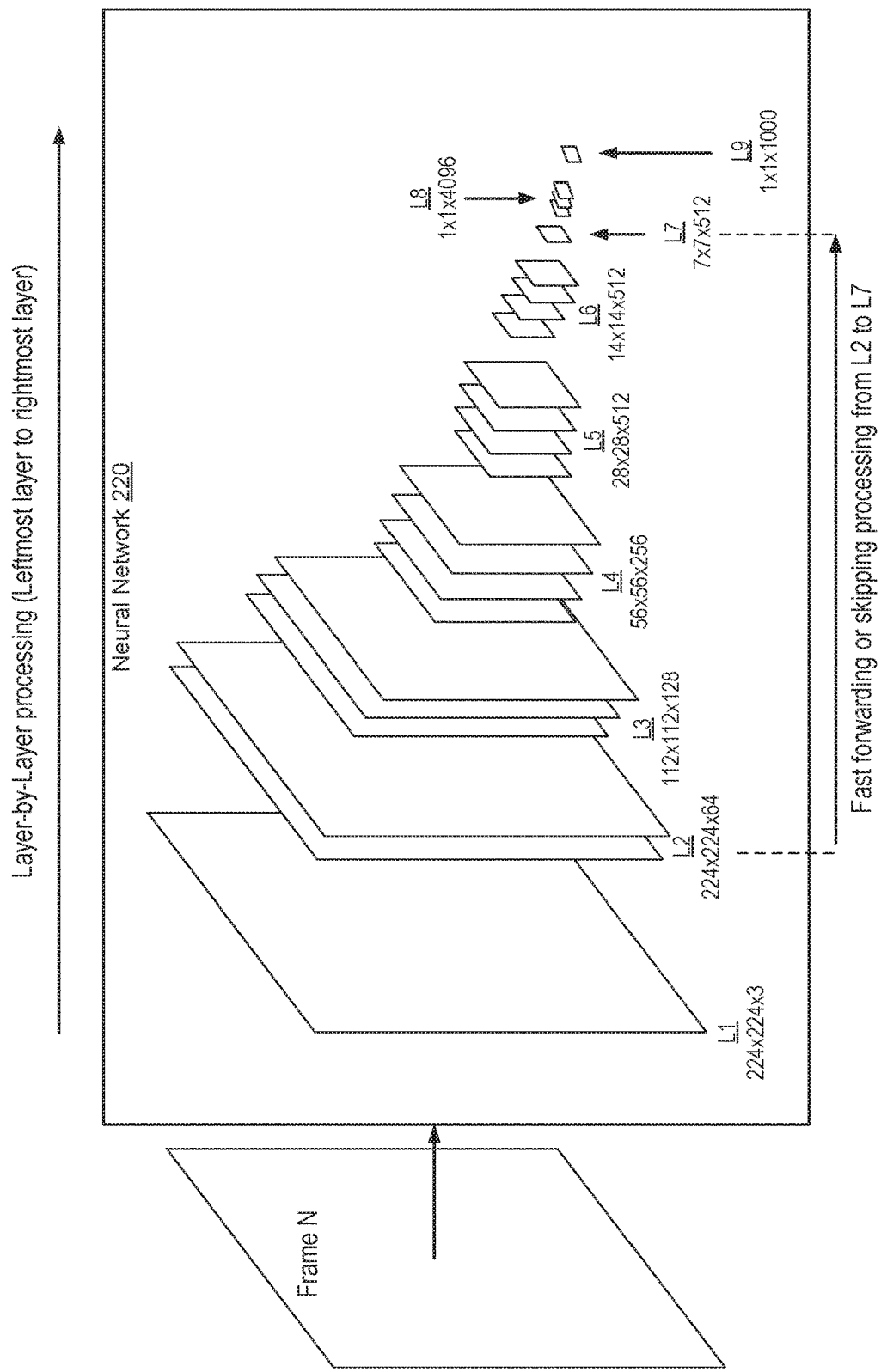
FIG. 2 illustrates an example a neural network including multiple sets of operations, according to one embodiment.

FIG. 2 illustrates an example of a multi-layer neural network 220 configured to process a video frame. As illustrated, the example neural network 220 receives a frame of a video (Frame N) and pushes the frame through a computation set generator including multiple layers (e.g., L1, L2, L3 . . . L9). In one embodiment, the video frame is first processed by the leftmost layer (L1) and proceeds from left to right in the layer-by-layer processing, as shown in FIG. 2.

In one embodiment, as Frame N is processed at each layer, the output of one layer may be provided as an input to another layer. For example, application of the set of operations representing the second layer (L2) may generate data about the image that is added to the data generated as a result of the application of the set of operations representing the first layer (L1). For example, a first layer (L1) may analyze 9 pixels of the image frame N, a second layer may analyze 81 pixels of the image frame N, a third layer may analyze 243 pixels of the image frame N, and so on. In one embodiment, as the processing continues from left to right, the neural network 220 is "zooming" out so that a greater number of pixels are examined at each layer (moving from left to right in FIG. 2). With regard to FIG. 2, the leftmost layers have a relatively small receptive field, wherein each computation for those layers analyzes a relatively small portion of the image. In one embodiment, as the layer-by-layer processing proceeds to the right, the receptive field increases, taking into account more of the image frame N and building upon the computations performed with respect to the processing of the previous layers. In one embodiment, with reference to FIG. 2, an amount of operations performed by each layer of the neural network 220 is proportional to the size of the rectangles representing the respective layers. Accordingly, in one embodiment, a large portion of the operations are performed by the leftmost layers having the largest size, as shown in FIG. 2. For example, an amount of work performed by a given layer is represented by a product of the numbers describing the image size (e.g., the amount of work performed by layer 1 in FIG. 2 is represented by the product of 224×224×3). In one embodiment, the amount of work performed by a layer may be a function of a number of parameters processing by the layer.

With reference to FIG. 1, in one embodiment, the computation set comparison module 126 receives a matrix (e.g., M2) corresponding to the result of the processing of a particular layer (e.g., Layer 2) of a frame (e.g., Frame N+1) from the computation set generator 124. In one embodiment, the computation set comparison module 126 retrieves a matrix (e.g., M1) corresponding to the processing of a previous frame (e.g., Frame N) by the same layer (e.g., Layer 2). In one embodiment, the computation set comparison module 126 performs a comparison between the matrix M1 and matrix M2. In one embodiment, the computation set comparison module 126 compares the corresponding computation set blocks (or sub-tables) of layers in the contiguous frames N and N+1.

In one embodiment, the comparison may include a statistical analysis of the matrices (e.g., the computation set including a three-dimensional tensor table having encoded values resulting from application of a layer) to determine a difference metric representing a level or amount of difference between the two matrices. In one embodiment, the difference metric may be compared to a threshold value to determine if the corresponding layers of the two frames are substantially similar to one another in whole or in part. In one embodiment, if the difference metric corresponding to two matrices is less than the threshold value, then it may be determined that the two frames are the same or substantially the same, and the inference processing of the current frame (e.g., Frame N+1) may be terminated. In one embodiment, if the two frames are determined to be the same based on a comparison of the matrices corresponding to a same layer of the processing (e.g., Layer 2), then further interference processing of the frame being analyzed can be terminated and a result associated with the previous frame (Frame N) may also be associated with the current frame (Frame N+1).

In one embodiment, the result associated with a given frame may be a feature map 142 generated by the feature map generator 128. For example, the computation set generator 124 may apply the set of operations corresponding to L2 (the 224×224×64 layer shown in FIG. 2) to Frame N+1. In one embodiment, a matrix representing the results (e.g., 1,000 labels associated with the image frame) are stored (e.g., M2 (Frame N+1, L2)) in the computation set storage 130. In one embodiment, the computation set comparison module 126 may retrieve the results of the same layer processing of a previous frame (e.g., Frame N) and compare to those results (e.g., 1,000 labels corresponding to L2 (224×224×64) and Frame N (e.g., M1 (Frame N, L2)) to M2. In one embodiment, if the difference metric is less than a threshold value and it is determined that the entire Frame N and N+1 are the same or substantially the same, then the processing of Frame N+1 can "skip" ahead and apply a final result (e.g., a feature map) of Frame N to Frame N+1. In one embodiment, if the matrices match, the feature map for Frame N is associated with Frame N+1 (e.g., a final classification represented by a feature map for Frame N is also applied to Frame N+1). For example, if the processing of Frame N generates a feature map indicating that Frame N includes a "dog", then the same final classification is applied to Frame N+1 (e.g., Frame N+1 also has a same feature map indicating a classification of a "dog").

In one embodiment, the computation set comparison module 126 may map a value of the difference metric to a subsequent layer to which processing may be skipped. In one embodiment, the mapping may indicate that if the difference metric is in a first range of values, processing is skipped to the next layer (e.g., from L2 to L3). In one embodiment, a mapping may be established which indicates that if the difference metric value is in a second range of values, processing is skipped two layers ahead (e.g., from L2 to L4). In one embodiment, the mapping may provide an indication of a particular layer to skip or fast forward to in view of the mapping of ranges associated with the difference metric value as determined by the comparison of matrices associated with the application of a given layer (e.g., layer 2) to two contiguous frames.

In one embodiment, the one or more feature maps 142 generated by the feature map generator 128 may be provided to the detection module 150. In one embodiment, the detection module 150 may aggregate and analyze the multiple features maps associated with the video 110 to generate one or more final classifications for the video 110. In one embodiment, the detection module 150 may generate a final result or classification of the deep learning processing indicating whether an object is detected in the one or more frames of video 110. In one embodiment, the detection module 150 may be an object detection module, a concept detection module, or the like.

In one embodiment, the neural network 120 may be implemented using a central processing unit (CPU) or a graphic processing unit (GPU) configured to detect an object. In one embodiment, the CPU and/or GPU corresponds to processing device 138. In one embodiment, the neural network 120 is a set of instructions stored in memory 140 and executable by the processing device 138. In one embodiment, the neural network 120 may be implemented as dedicated hardware components (e.g., a deep learning processor using GPUs or Application-specific Integrated Circuits (ASICs). In one embodiment, the neural network 120 is configured to perform the functionality described above and with regard to FIGS. 2-8.

Figure 3:
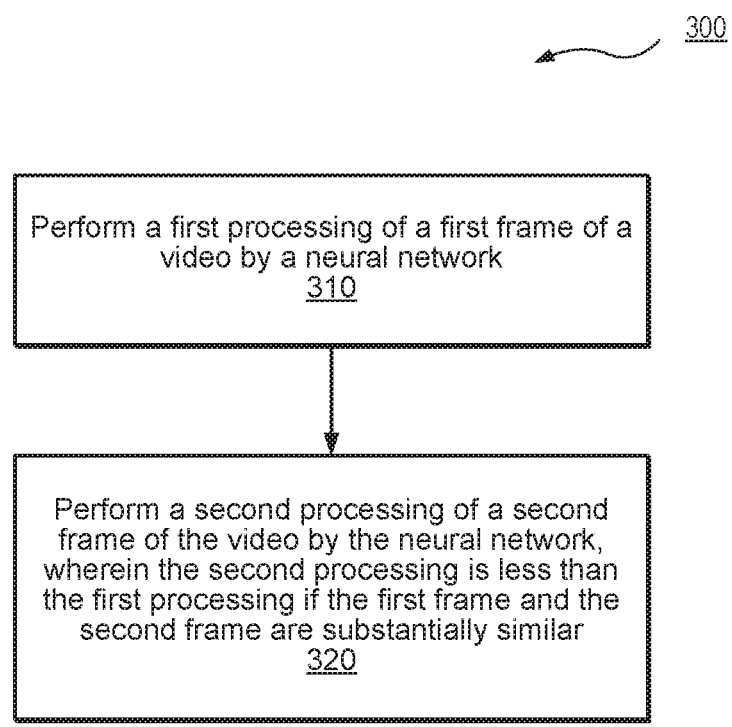
FIG. 3 is a flow diagram illustrating neural network processing, according to one embodiment.

FIG. 3 illustrates a flowchart that provides an example of a process 300 executed by a neural network (e.g., neural network 120 of FIG. 1), according to various embodiments. It is understood that the flowchart of FIG. 3 provides an example of the many different types of functional arrangements that may be employed to implement the operation of the neural network 120 as described herein. Process 300 may be performed by a processing logic that may comprise hardware (e.g., circuitry, dedicated logic, programmable logic, microcode, etc.), software (e.g., instructions run on a processing device), or a combination thereof.

In block 310, a first processing of a first frame of a video is performed by a neural network. In one embodiment, the video including multiple frames (e.g., Frame N and Frame+1) is received by the neural network. In one embodiment, a layer-by-layer processing is performed by the neural network with regard to a first frame (e.g., Frame N). In one embodiment, results of the processing (e.g., a computation set including a matrix corresponding to the processing of the frame at each layer of the neural network) are stored. In one embodiment, the first frame is processed by each of the layers of the example neural network of FIG. 2 (e.g., L1, L2, and L3 . . . L9).

In block 320, a processing of a second frame of the video (e.g., Frame N+1) is performed by the neural network. In one embodiment, the processing of the second frame is less than the processing of the first frame (e.g., fewer layers of the neural network are applied to the second frame) if the first frame and the second frame are substantially similar. In one embodiment, the layer-by-layer processing of the second frame may be terminated if it is determined that the first frame and the second frame are at least substantially the same, without applying all of the layers of the neural network to the second frame (e.g., Frame N+1). For example, if the matrix generated for L1 of frame N matches the matrix generated for L1 of frame N+1, then the processing of one or more additional layers (e.g., L2-5) of frame N+1 may be skipped. The results of the processing of the various layers of frame N may be applied to frame N+1, for example.

Figure 4:
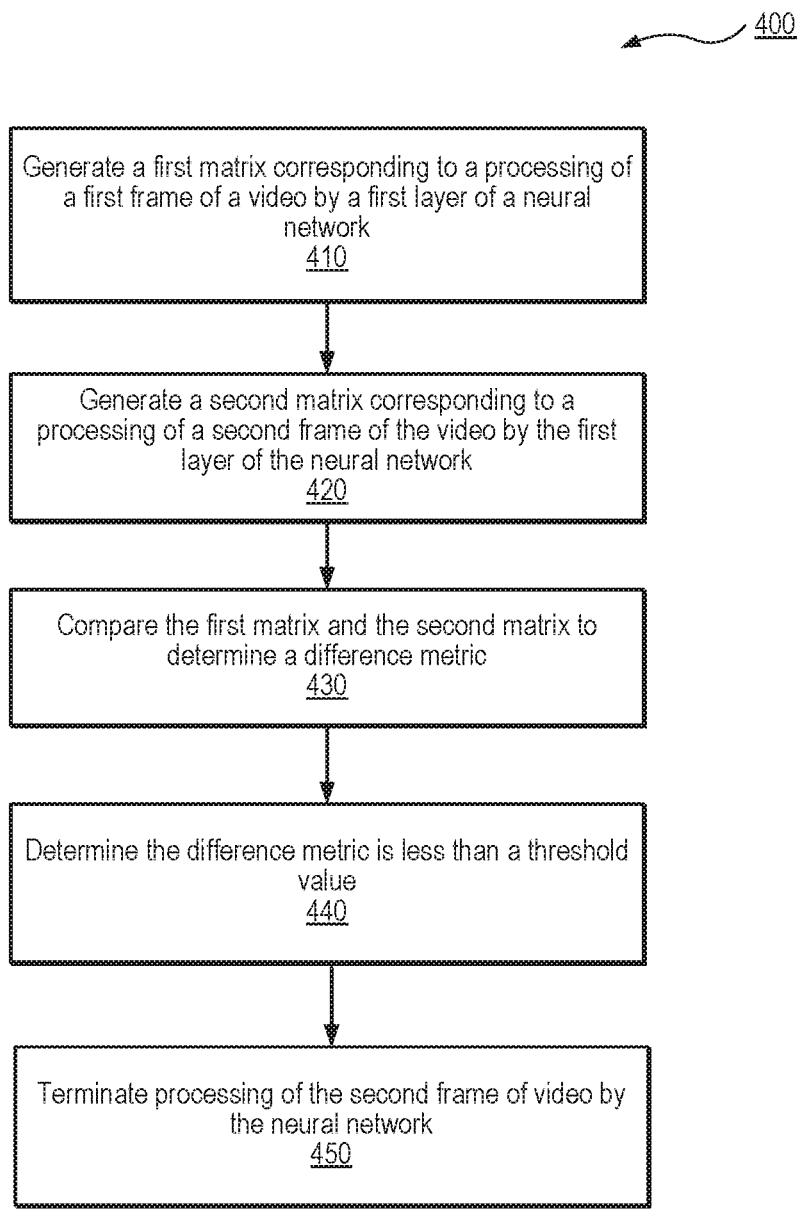
FIG. 4 is a flow diagram illustrating neural network processing, according to one embodiment.

FIG. 4 illustrates a flowchart that provides an example of a process 400 executed by a neural network (e.g., neural network 120 of FIG. 1), according to various embodiments. In block 410, a first matrix corresponding to the processing of a first frame of a video by a layer of a neural network is generated. For example, the first matrix (M1) may include results of the set of operations of layer 2 (L2) of the neural network as applied to the first frame (Frame N). In one embodiment, the first matrix (M1) is stored for later comparison with a matrix associated with the second frame.

In block 420, a second matrix corresponding to the processing of a second frame of the video by the same layer of the neural network is generated. For example, the second matrix (M2) may include results of the set of operations of layer 2 (L2) of the neural network as applied to the second frame (Frame N+1).

In block 430, the first matrix and the second matrix are compared to determine a difference metric. For example, the output of layer 2 (L2) as applied to Frame N+1 is a first multi-dimensional matrix (or tensor table). In one embodiment, this matrix (M2, L2, Frame N+1) is substantially similar to a matrix computed for the corresponding layer (L2) as applied to a previous frame (e.g., Frame N), then it may be determined that the results of the subsequent further layers applied to Frame N+1 will be substantially similar to the results of the subsequent layers (e.g., L3 through L9 of FIG. 2) applied to Frame N.

In block 440, if the difference metric is less than a threshold value, it is determined that the first frame and the second frame are substantially similar. In one embodiment, the entire matrices corresponding to a layer of the neural network (e.g., Layer 2) of contiguous frames (Frames N and N+1) may match (e.g., have a difference metric that is less than the threshold value). In one embodiment, if the entire matrices match, then further processing of the later frame (e.g., frame N+1) by the remaining layers of the neural network may be terminated.

In block 450, processing by the neural network of the second frame (Frame N+1) is terminated. In one embodiment, in view of the determination that the first frame and the second frame are substantially similar, processing of the second frame (Frame N+1) is terminated and the results corresponding to the layer-by-layer analysis of Frame N are associated with Frame N+1.

Figure 5:
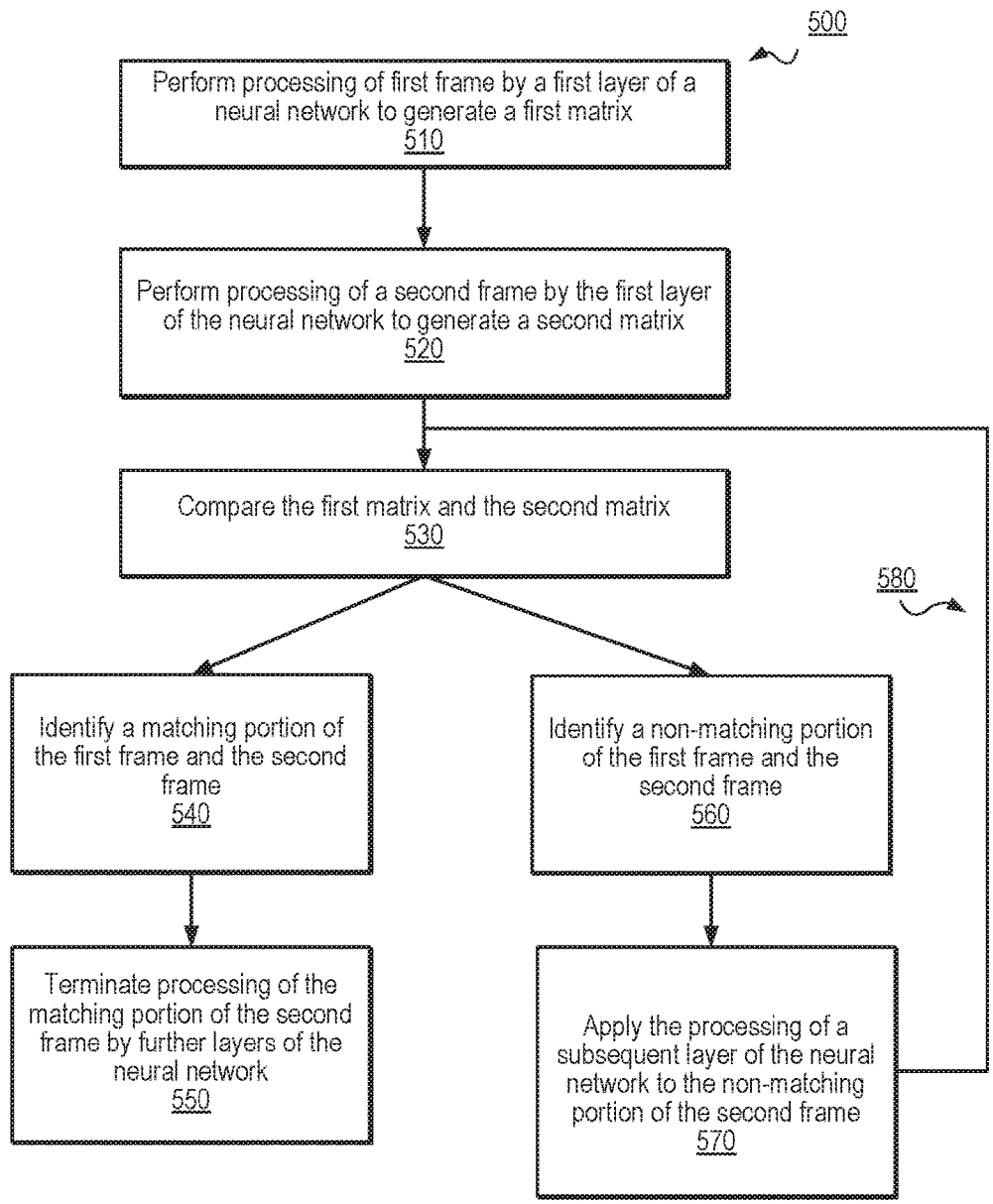
FIG. 5 is a flow diagram illustrating neural network processing, according to one embodiment.

FIG. 5 illustrates a flowchart that provides an example of a process 500 executed by a neural network (e.g., neural network 120 of FIG. 1), according to various embodiments. It is understood that the flowchart of FIG. 5 provides an example of the many different types of functional arrangements that may be employed to implement the operation of the neural network 120 as described herein. Process 500 may be performed by a processing logic that may comprise hardware (e.g., circuitry, dedicated logic, programmable logic, microcode, etc.), software (e.g., instructions run on a processing device), or a combination thereof. In one embodiment, the neural network executes the method 500 to identify matching and non-matching portions of two frames and applies a subsequent layer of the neural network to the non-matching portion.

In block 510, a neural network applies a first layer of processing to a first frame of a video to generate and store a first matrix, as detailed above. In block 520, the same layer of the neural network is applied to a second frame of the video to generate and store a second matrix. In block 530, the two matrices (e.g., the first matrix and the second matrix) are compared.

In blocks 540 and 560, in view of the comparison, a matching portion and a non-matching portion of the first frame and the second frame are identified. In an example, during the processing of layer 2 (L2) of Frame N+1, it may be determined that a top half of the frame is substantially the same as a top half of the previous frame (e.g., Frame N).

In block 550, the processing of the matching portion by one or more subsequent layers of the neural network is terminated. In one embodiment, the results of the processing of the first frame by the one or more further layers of the neural network of that region of the frame (e.g., the matching portion) are applied to the second frame, since it is determined that there was no change in that portion of the image between frame 1 and frame 2.

In block 570, the processing of a subsequent layer of the neural network is applied to the non-matching portion of the second frame. In one embodiment, the set of additional operations associated with a subsequent layer of neural network is applied to the non-matching portion to generate additional computation sets (e.g., additional tensor entries).

In one embodiment, in block 570, processing may be skipped ahead or fast forwarded to a later layer for processing of the non-matching portion. In one embodiment, even though this portion of the two frames may not meet the threshold to be considered a "matching" portion, the non-matching portion may be sufficiently similar to enable one or more layers of the neural network to be skipped without sacrificing the accuracy of the final classification. In one embodiment, by fast forwarding to a subsequent layer (e.g., skipping from processing layer 2 to processing layer 4, layer 5, or layer 6), the computations associated with the intervening layers (e.g., the layers that are skipped) are not performed, thereby resulting in a reduced computational expense. For example, with reference to FIG. 2, based on the comparison of a current frame (e.g., Frame N+1) and the previous frame (Frame N) corresponding to the processing of layer 2, it may be determined that the processing of Frame N+1 may be skipped ahead from layer 2 to layer 7. In one embodiment, advantageously, by fast forwarding from layer 2 to layer 7, the computational expense associated with application of the sets of operations corresponding to layer 3 through layer 6 is saved. In one embodiment, a feedback loop 580 may be established to iteratively compare matrices generated for the non-matching portion by later layers.

In one embodiment, the processing of a given frame may be skipped ahead to a last (or rightmost) layer (e.g., layer 9 in FIG. 2). In one embodiment, the operation of the last layer (e.g., layer 9 in FIG. 2) may be performed on the given frame. In one embodiment, a result associated with application of the last layer to the previous frame may be applied to the given frame. In one embodiment, one or more feature maps resulting from application of the layers of the neural network to the previous frame may be merged with computation sets corresponding to the given frame.

Figure 6:
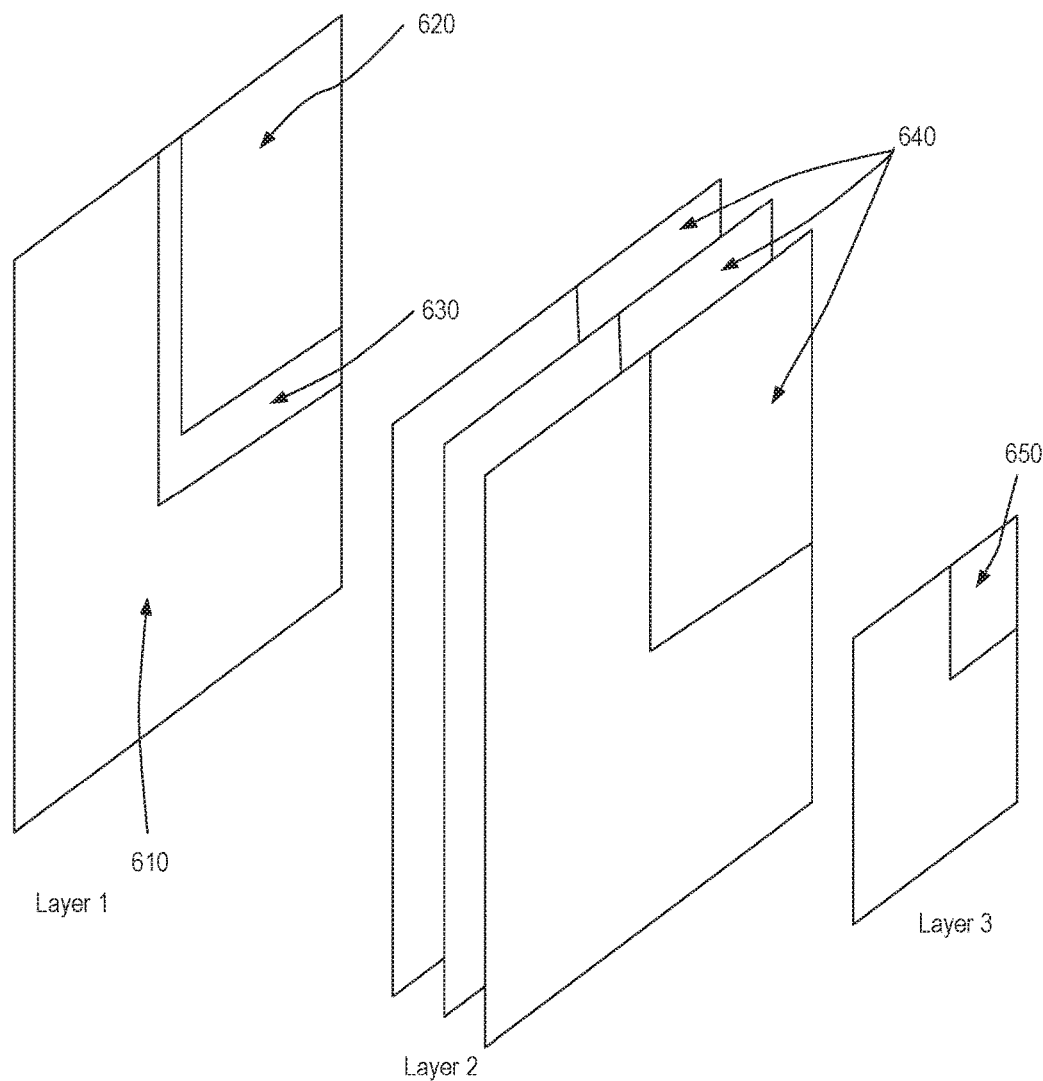
FIG. 6 illustrates exemplary sets of operations of a neural network applied to a portion of a frame, according to one embodiment.

For example, FIG. 6 illustrates multiple layers (e.g. Layer 1, Layer 2, and Layer 3) of a neural network as applied to a video including a first frame (Frame 1) and a second frame (Frame 2). In this example, it is determined that the portion 620 of Frame 2 includes changes as compared to Frame 1, while the remaining portion of Frame 2 and Frame 1 are the same. In one embodiment, based on a comparison of the results of the processing of layer 1 for the previous frame (Frame 1), a matching portion 610 and a non-matching portion 630 of Frame 2 are identified. In one embodiment, it is determined that additional processing by one or more subsequent layers (e.g., Layer 2, Layer 3, etc.) is desired to produce additional entries for a matrix or tensor table corresponding to Frame 2.

In one embodiment, layer 2 processing is applied to portion 640 of Frame 2, while the layer 2 processing is terminated with respect to the remaining portion of Frame 2. In one embodiment, the operations (e.g., computations) of layer 2 are applied to the portion 640, in view of the change in this portion of the frame as compared to the previous frame. In one embodiment, the information determined with respect to the matching portion 610 in view of the processing of Frame 1 by layer 1 is stored and applied to the corresponding portion of Frame 2.

In one embodiment, for example, a first portion of the matrices corresponding to the results of the processing by a layer (e.g., L2) of contiguous frames (N and N+1) may match, while a second portion of the matrices does not match. In one embodiment, processing continues with respect to the portion that is different (i.e., the non-matching portion), while the processing is terminated with respect to the portion that is the same (i.e., the matching portion) because it is known how the matching portion is going to map onto the next layer (e.g., Layer 3) of the network. For example, there may be movement in one portion of Frame N+1 relative to the corresponding part of Frame N (e.g., movement in the foreground of the image frames), while another portion of the frames (N and N+1) remains the same (e.g., the background of the image frames is unchanged).

For the non-matching portion 630, processing continues to one or more subsequent layers and corresponding results (e.g., labels) are generated for those layers. In one embodiment, the results from the previously identified matching portion of Frame N and N+1 are stored and later merged with the results of the processing of Layer 3 of Frame N+1 (e.g., the results corresponding to the processing of portion 650 by Layer 3 of the neural network).

In one embodiment, multiple different threshold values or ranges may be established to determine which subsequent layer to skip ahead to when processing a frame. In one embodiment, the mapping may provide an indication of the layer to skip to in view of ranges associated with the difference metric determined by the comparison of a matrix resulting from application of a given layer (e.g., layer 2) to two frames. In one embodiment, a value of the difference metric may be mapped to a subsequent layer to which processing may be skipped. For example, the mapping may indicate that if the difference metric corresponding to a comparison of the two frames is in a first range, processing is skipped or fast forwarded to the next layer in the neural network (e.g., from layer 2 to layer 3). In one embodiment, the mapping may indicate that if the difference metric is in a second range, processing of the later frame may be skipped two layers ahead (e.g., from layer 2 to layer 4). In one embodiment, the set of operations associated with that later layer (i.e., the layer skipped to) may be applied to the later frame (e.g., Frame N+1), thereby skipping the processing associated with the "skipped" layers of the neural network.

Figure 7:
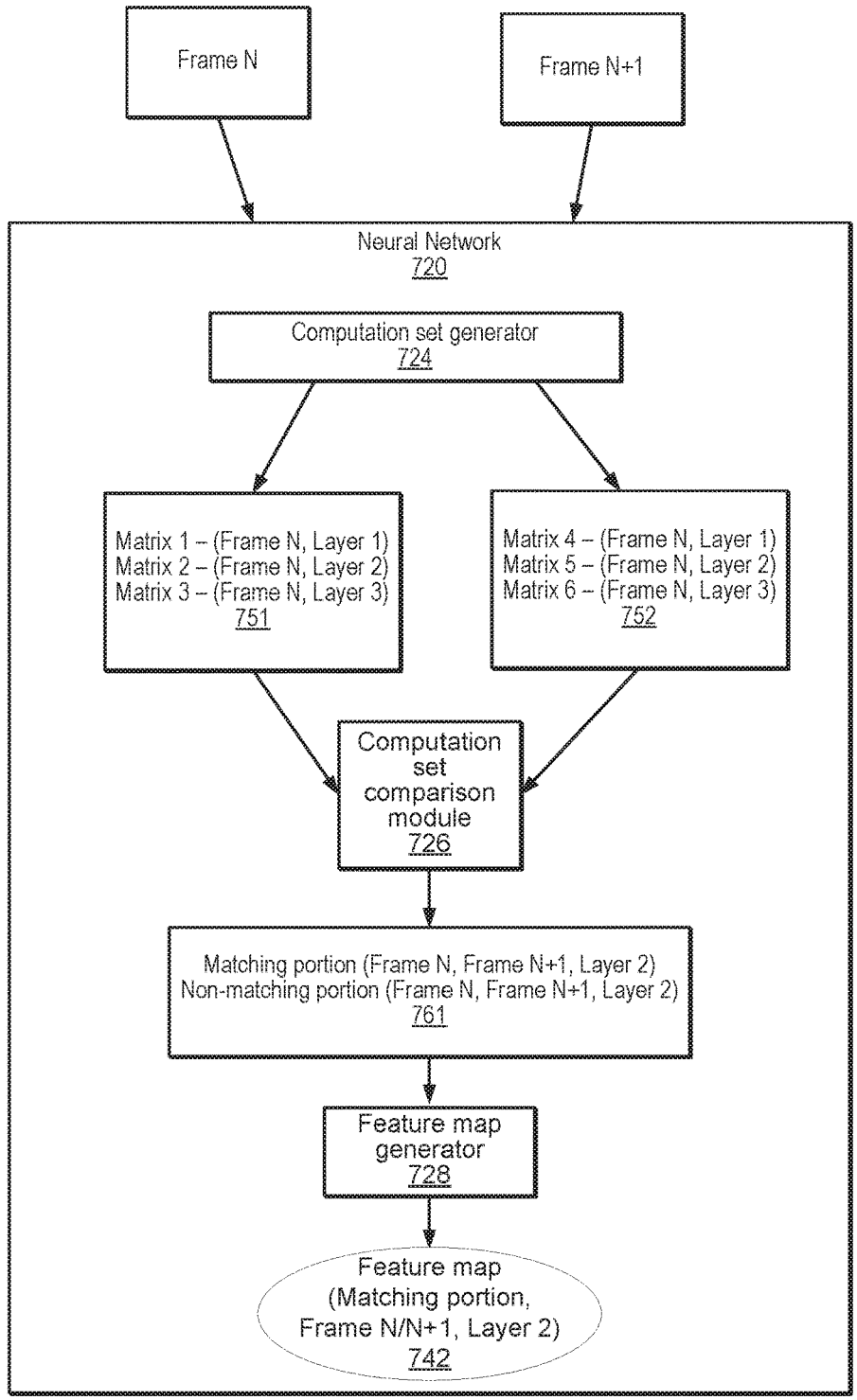
FIG. 7 illustrates processing of multiple frames of a video by a neural network, according to one embodiment.

FIG. 7 illustrates exemplary processing performed by a neural network 620 as it relates to multiple frames of a video (e.g., Frame N and Frame N+1). As shown in FIG. 7, a computation set generator 724 generates multiple matrices 751 corresponding to respective layers of the neural network based on the processing of Frame N. For example, Matrix 1 includes a first computation set (e.g. tensor table entries) representing the results of the operations performed by layer 1 on Frame N, Matrix 2 includes a second computation set (e.g. tensor table entries) representing the results of the operations performed by layer 2 on Frame N, and Matrix 3 includes a third computation set (e.g. tensor table entries) representing the results of the operations performed by layer 3 on Frame N.

In one embodiment, the computation set generator 724 generates multiple matrices 752 corresponding to application of the layers of the neural network to process Frame N. For example, Matrix 4 includes a computation set (e.g. tensor table entries) representing the results of the operations performed by layer 1 on Frame N+1, Matrix 5 includes a computation set (e.g. tensor table entries) representing the results of the operations performed by layer 2 on Frame N+1, and Matrix 3 includes a computation set (e.g. tensor table entries) representing the results of the operations performed by layer 3 on Frame N+1.

In one embodiment, the computation set comparison module 726 compares the matrices corresponding to a given layer for the two frames. For example, during the processing of Frame N+1 by layer 2 of the neural network, matrix 5 is compared to matrix 2. In this example, the computation set comparison module 726 may identify a matching portion (Frame N, Frame N+1, Layer 2) an a non-matching portion (Frame N, Frame N+1, Layer 2). In one embodiment, the feature map generator 728 identifies the feature map 742 corresponding to the matching portion that was generated during processing of Frame N. In one embodiment, the identified feature map (Matching portion, Frame N/N+1, Layer 2) is applied to Frame N+1, and further processing by the neural network for that portion is terminated. In one embodiment, the feature map generated by layer 2 for Frame N is merged with one or more feature maps generated for the non-matching portion of Frame N+1 by subsequent layers of the neural network.

Figure 8:
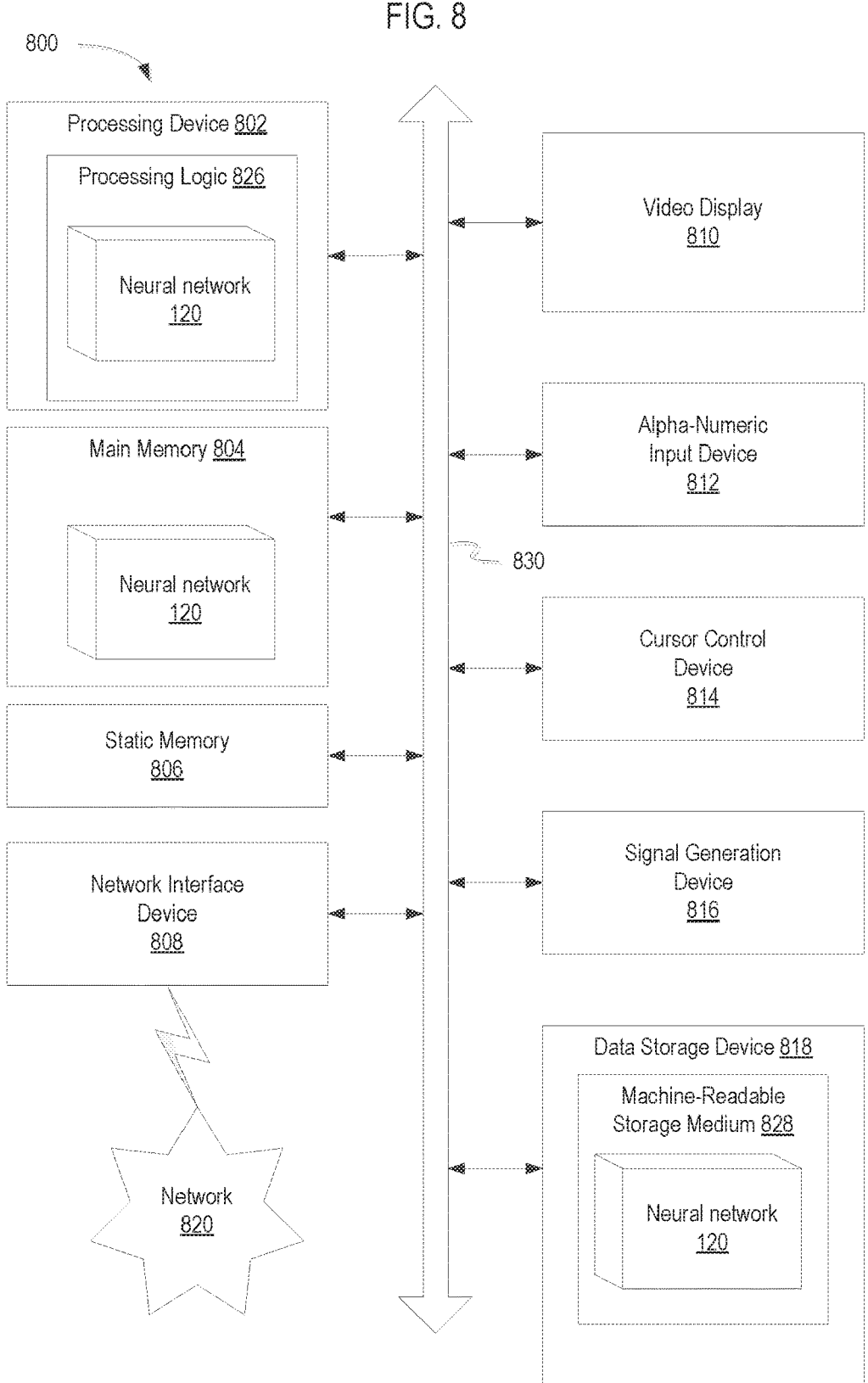
FIG. 8 is a schematic block diagram that provides an example illustration of a computing environment executing instructions relating to a neural network, according to one embodiment.

FIG. 8 illustrates a diagrammatic representation of a machine in the example form of a computer system 800 including a set of instructions executable by a neural network 120 to cause the system to perform any one or more of the methodologies discussed herein. In one embodiment, the neural network may include instructions to enable execution of the processes and corresponding components shown and described in connection with FIGS. 1-7.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. In various implementations of the present disclosure, the processing device 802 is configured to execute instructions for the neural network 120 for performing the operations and processes described herein.

The computer system 800 may further include a network interface device 608. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions of the neural network 120 embodying any one or more of the methodologies or functions described herein. The instructions may also reside, completely or at least partially, within the main memory 804 and/or within processing logic 826 of the processing device 802 during execution thereof by the computer system 800, the main memory 804 and the processing device 802 also constituting computer-readable media.

The instructions may further be transmitted or received over a network 820 via the network interface device 808. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing", "applying", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   performing a first processing of a first frame of a video by a neural network, wherein the first processing comprises application of a first layer and a second layer of the neural network; and
   performing a second processing of a second frame of the video by the neural network, wherein application of the second layer of the neural network is skipped in the second processing if the first frame and the second frame are substantially similar.

2. The method of claim 1, wherein the second processing comprises skipping one or more sets of operations of the second layer of the neural network.

3. The method of claim 1, wherein the first processing comprises:
   applying a first set of operations of the first layer of the neural network to the first frame to generate a first tensor table.

4. The method of claim 3, wherein the second processing comprises:
   applying the first set of operations of the first layer of the neural network to the second frame to generate a second tensor table.

5. The method of claim 4, wherein the first frame and the second frame are identified as substantially similar if a difference metric between the first tensor table and the second tensor table is less than a threshold value.

6. The method of claim 1, further comprising:
   generating a tensor table comprising results of an application of a first set of operations of the first layer of the neural network to the second frame; and
   determining a difference metric between the tensor table and a stored tensor table corresponding to an application of the first set of operation of the first layer of the neural network to the first frame.

7. The method of claim 6, further comprising terminating the second processing if a difference metric between the tensor table and the stored tensor table is less than a threshold value.

8. A system comprising:
   a processing device to execute a neural network; and
   a memory to store computer-executable instructions that, if executed, cause the processing device to:
      perform a first processing of a first frame of a video by a neural network, wherein the first processing comprises application of a first set of operations of a first layer of the neural network and a second set of operations of a second layer of the neural network;
      compare a first set of results of the first set of operations of the first layer applied to the first frame to a second set of results of the first set of operations of the first layer applied to a second frame of the video;
      determine that a difference between the first set of results and the second set of results is less than a threshold value; and
      process an instruction to skip application of the second layer of the neural network to the second frame.

9. The system of claim 8, wherein the neural network comprises a plurality of layers, and wherein each of the plurality of layers comprises a set of operations.

10. The system of claim 9, wherein application of a plurality of layers of the neural network to the second frame is skipped.

11. The system of claim 8, the processing device to:
    generate a feature map corresponding to application of the second layer of the neural network to the first frame; and
    associate the feature map with the second frame.

12. The system of claim 8, the processing device to:
    generate a first feature map corresponding to the first processing of the first frame; and
    merge the first feature map with a second feature map corresponding to second processing of the second frame.

13. The system of claim 8, wherein the second processing comprises skipping application of a plurality of layers of the neural network to the second frame.

14. The system of claim 8, wherein an application to the second frame of a plurality of sets of operations of the neural network is skipped.

15. The system of claim 8, the processing device to:
generate a tensor table comprising the second set of results of an application of a first set of operations of the neural network to the second frame;
determine a difference metric between the tensor table and a stored tensor table comprising the first set of results;
determine the difference metric is within a first range of values; and
identify an additional set of operations of the neural network to continue the second processing of the second image, wherein the additional set of operations corresponds to the first range of values.

16. A non-transitory computer-readable storage device storing computer-executable instructions that, if executed by a processing device, cause the processing device to:
perform a first processing of a first frame of a video by a neural network, wherein the first processing comprises application of a first layer and a second layer of the neural network;
determine that a difference between the first frame and a second frame of the video is less than a threshold value; and
perform a second processing of a second frame of the video by the neural network, wherein application of the second layer of the neural network is skipped in the second processing.

17. The non-transitory computer-readable storage device of claim 16, wherein application of a plurality of layers of the neural network to the second frame is skipped.

18. The non-transitory computer-readable storage device of claim 16, the processing device to determine the difference based on a comparison of a first tensor table corresponding to the first frame and a second tensor table corresponding to the second frame.

19. The non-transitory computer-readable storage device of claim 18, wherein the first tensor table is generated by an application of a first set of operations of the first layer to the first frame.

20. The non-transitory computer-readable storage device of claim 19, wherein the second tensor table is generated by an application of the first set of operations of the first layer to the second frame.

* * * * *